(12) United States Patent
Glew

(10) Patent No.: US 7,644,258 B2
(45) Date of Patent: Jan. 5, 2010

(54) HYBRID BRANCH PREDICTOR USING COMPONENT PREDICTORS EACH HAVING CONFIDENCE AND OVERRIDE SIGNALS

(75) Inventor: Andrew Forsyth Glew, Hillsboro, OR (US)

(73) Assignee: Searete, LLC, Bellevue, WA (US)

( * ) Notice: Subject to any disclaimer, the term of this patent is extended or adjusted under 35 U.S.C. 154(b) by 0 days.

(21) Appl. No.: 11/215,835

(22) Filed: Aug. 29, 2005

(65) Prior Publication Data

US 2007/0083739 A1    Apr. 12, 2007

(51) Int. Cl.
  G06F 7/38    (2006.01)
  G06F 9/00    (2006.01)
  G06F 9/44    (2006.01)
  G06F 15/00   (2006.01)

(52) U.S. Cl. .................................................... 712/239
(58) Field of Classification Search .................. 712/239
   See application file for complete search history.

(56) References Cited

U.S. PATENT DOCUMENTS

| | | |
|---|---|---|
| 5,379,428 A | 1/1995 | Belo |
| 5,592,679 A | 1/1997 | Yung |
| 5,613,126 A | 3/1997 | Schmidt |
| 5,694,589 A | 12/1997 | Glew et al. |
| 5,701,439 A | 12/1997 | James et al. |
| 5,701,508 A | 12/1997 | Glew et al. |
| 5,708,843 A | 1/1998 | Abramson et al. |
| 5,717,882 A | 2/1998 | Abramson et al. |
| 5,721,855 A | 2/1998 | Hinton et al. |
| 5,721,857 A | 2/1998 | Glew et al. |
| 5,724,527 A | 3/1998 | Karnik et al. |
| 5,724,536 A | 3/1998 | Abramson et al. |
| 5,727,176 A | 3/1998 | Clift et al. |
| 5,729,728 A | 3/1998 | Colwell et al. |
| 5,740,393 A | 4/1998 | Vidwans et al. |
| 5,748,937 A | 5/1998 | Abramson |
| 5,749,084 A | 5/1998 | Huck et al. |
| 5,751,983 A | 5/1998 | Abramson et al. |
| 5,751,986 A | 5/1998 | Fetterman et al. |
| 5,751,996 A | 5/1998 | Glew et al. |
| 5,778,245 A | 7/1998 | Papworth et al. |
| 5,778,407 A | 7/1998 | Glew et al. |
| 5,796,637 A | 8/1998 | Glew et al. |
| 5,809,271 A | 9/1998 | Colwell et al. |
| 5,819,079 A | 10/1998 | Glew et al. |
| 5,826,094 A | 10/1998 | Colwell et al. |
| 5,826,109 A | 10/1998 | Abramson et al. |
| 5,835,748 A | 11/1998 | Orenstein et al. |

(Continued)

OTHER PUBLICATIONS

Evers, Chang & Patt; Using Hybrid Branch Predictors to Improve Branch Prediction Accuracy in the Presence of Context Switches; May 1996; ACM Press; pp. 3-11.*

(Continued)

*Primary Examiner*—Eddie P Chan
*Assistant Examiner*—Corey Faherty

(57) ABSTRACT

Various embodiments are described relating to processors, branch predictors, branch prediction systems, and computing systems. In an example embodiment, a processor includes a plurality of branch predictors. Each branch predictor is adapted to provide a prediction and an override signal. In the example embodiment, the processor futher includs a branch prediction control circuit. The branch prediction circuit is adapted to generate a branch prediction based on the prediction and the override signal from each predictor.

10 Claims, 8 Drawing Sheets

U.S. PATENT DOCUMENTS

| | | | |
|---|---|---|---|
| 5,852,726 | A | 12/1998 | Lin et al. |
| 5,854,914 | A | 12/1998 | Bodas et al. |
| 5,860,154 | A | 1/1999 | Abramson et al. |
| 5,872,972 | A | 2/1999 | Boland et al. |
| 5,881,223 | A | 3/1999 | Agrawal et al. |
| 5,881,262 | A | 3/1999 | Abramson et al. |
| 5,909,696 | A | 6/1999 | Reinhardt et al. |
| 5,913,050 | A | 6/1999 | Boggs et al. |
| 5,935,240 | A | 8/1999 | Mennemeier et al. |
| 5,948,097 | A | 9/1999 | Glew et al. |
| 5,951,670 | A | 9/1999 | Glew et al. |
| 5,956,753 | A | 9/1999 | Glew et al. |
| 5,974,523 | A | 10/1999 | Glew et al. |
| 5,987,600 | A | 11/1999 | Papworth et al. |
| 6,035,393 | A | 3/2000 | Glew et al. |
| 6,047,369 | A | 4/2000 | Colwell et al. |
| 6,079,014 | A | 6/2000 | Papworth et al. |
| 6,170,997 | B1 | 1/2001 | Glew et al. |
| 6,185,221 | B1 | 2/2001 | Aybay |
| 6,204,174 | B1 | 3/2001 | Glew et al. |
| 6,297,843 | B1 | 10/2001 | Glew |
| 6,374,349 | B1* | 4/2002 | McFarling ................ 712/239 |
| 6,378,062 | B1 | 4/2002 | Abramson et al. |
| 6,427,206 | B1* | 7/2002 | Yeh et al. .................... 712/239 |
| 6,629,175 | B1 | 9/2003 | Manning et al. |
| 6,647,482 | B1 | 11/2003 | Ronen et al. |
| 6,678,816 | B2 | 1/2004 | Ronen et al. |
| 6,792,523 | B1 | 9/2004 | Glew et al. |
| 6,829,764 | B1 | 12/2004 | Cohen et al. |
| 6,873,184 | B1 | 3/2005 | McMinn et al. |
| 6,938,151 | B2* | 8/2005 | Bonanno et al. ............ 712/239 |
| 7,024,555 | B2 | 4/2006 | Kozuch et al. |
| 7,114,059 | B2* | 9/2006 | Wilkerson .................. 712/217 |
| 7,124,273 | B2 | 10/2006 | Glew et al. |
| 7,133,906 | B2 | 11/2006 | Price et al. |
| 7,149,882 | B2 | 12/2006 | Glew et al. |
| 7,165,169 | B2* | 1/2007 | Henry et al. ................ 712/240 |
| 7,533,252 | B2* | 5/2009 | Davis et al. ................. 712/239 |
| 2001/0042188 | A1 | 11/2001 | Tremblay et al. |
| 2002/0044563 | A1 | 4/2002 | Magill et al. |
| 2002/0083307 | A1 | 6/2002 | Sager et al. |
| 2002/0120663 | A1 | 8/2002 | Binns |
| 2002/0194464 | A1* | 12/2002 | Henry et al. ................ 712/239 |
| 2003/0084346 | A1 | 5/2003 | Kozuch et al. |
| 2003/0088756 | A1 | 5/2003 | Vishkin |
| 2003/0126442 | A1 | 7/2003 | Glew et al. |
| 2003/0126453 | A1 | 7/2003 | Glew et al. |
| 2003/0126454 | A1 | 7/2003 | Glew et al. |
| 2003/0163662 | A1 | 8/2003 | Glew et al. |
| 2003/0196065 | A1 | 10/2003 | Ronen et al. |
| 2003/0229794 | A1 | 12/2003 | Sutton, II et al. |
| 2004/0003321 | A1 | 1/2004 | Glew et al. |
| 2004/0117539 | A1 | 6/2004 | Bennett et al. |
| 2004/0163083 | A1 | 8/2004 | Wang et al. |
| 2004/0210741 | A1 | 10/2004 | Glew et al. |
| 2004/0225872 | A1* | 11/2004 | Bonanno et al. ............ 712/239 |
| 2005/0038977 | A1 | 2/2005 | Glew et al. |
| 2005/0058149 | A1 | 3/2005 | Howe |
| 2005/0080934 | A1 | 4/2005 | Cota-Robles et al. |
| 2005/0204118 | A1 | 9/2005 | Jen et al. |
| 2005/0210472 | A1 | 9/2005 | Accapadi et al. |
| 2006/0075402 | A1 | 4/2006 | Neiger et al. |
| 2006/0112388 | A1 | 5/2006 | Taniguchi et al. |
| 2007/0030277 | A1 | 2/2007 | Prokopenko et al. |
| 2007/0083735 | A1 | 4/2007 | Glew |
| 2008/0052500 | A1 | 2/2008 | Glew |
| 2008/0133868 | A1 | 6/2008 | Glew |
| 2008/0133883 | A1 | 6/2008 | Glew |
| 2008/0133885 | A1 | 6/2008 | Glew |
| 2008/0133889 | A1 | 6/2008 | Glew |
| 2008/0133893 | A1 | 6/2008 | Glew |

OTHER PUBLICATIONS

González & González; IEEE Transactions on Computers: Control-Flow Speculation through Value Prediction for Superscalar Processors; Dec. 2001; IEEE Computer Society; vol. 50, Issue 12; pp. 1362-1376.*

Gochman, Ronen, Anati, Berkovits, Kurts, Naveh, Saeed, Sperber & Valentine; Intel Technology Journal: The Intel Pentium M Processor: Microarchitecture and Performance; May 2003; Intel Corporation; vol. 07, Issue 02; pp. 21-36.*

Lai, Lu, Chen & Chen; Improving Branch Prediction Accuracy with Parallel Conservative Correctors; May 2005; ACM Press; pp. 334-341.*

Jacobsen, Rotenberg & Smith; Assigning Confidence to Conditional Branch Predictions; Dec. 1996; IEEE Computer Society; pp. 142-152.*

Heil, Smith & Smith; Improving Branch Predictors by Correlating on Data Values; Nov. 1999; IEEE Computer Society; pp. 28-37.*

Chang, Hao & Patt; Alternative Implementations of Hybrid Branch Predictors; Nov. 1995; IEEE Computer Society; pp. 252-257.*

McFarling; Combining Branch Predictors; Jun. 1993; Western Research Laboratory; WRL Technical Note TN-36; pp. 1-25.*

Chang et al.; Branch Classification: a New Mechanism for Improving Branch Prediction Performance; 1994; International Journal of Parallel Programming; pp. 1-10.*

Jimenez et al.; The Impact of Delay on the Design of Branch Predictors; 2000; 33$^{rd}$ Annual ACM/IEEE International Symposium on Microarchitectures; pp. 1-10.*

Glew, Andrew, "MLP yes! ILP no!—Memory Level Parallelism, or why I no longer care about Instruction Level Parallelism", ASPLOS 98 WACI session (Article), (Oct. 9, 1998), 1 pg.

Glew, Andrew, "MLP yes! ILP no!—Work on memory level parallelism. Stop worrying about IPC.", ASPLOS 98 WACI session (Presentation Slides), (Oct. 9, 1998), 8 pgs.

Hieb, Robert, et al., "Representing Control in the Presence of First-Class Continuations", Proceedings of the ACM SIGPLAN 1990 Conference on Programming Language Design and Implementation, ISBN: 0-89791-364-7,(Jun. 20-22, 1990), 66-77 pp.

Marr, Deborah T., et al., "Hyper-Threading Technology Architecture and Microarchitecture", Intel Technology Journal Q1, 2002, (2002), 12 pgs.

Stokes, Jon, "Introduction to Multithreading, Superthreading and Hyperthreading", http://arstechnica.com/articles/paedia/cpu/hyperthreading.ars/1, (Oct. 3, 2002), 18 pgs.

Tang, Zhizhong, et al., "GPMB—Software Pipelining Branch-Intensive Loops", IEEE Microarchitecture 1993, (1993), 21-29 pp.

Office Action for U.S. Appl. No. 11/215,833 dated Sep. 19, 2007.

International Search Report for PCT Patent Application No. PCT/US06/33662, mailed Oct. 10, 2007, 3 pages.

Patterson, David A. et al.; "Appendix B, The Basics of Logic Design"; *Computer Organization and Design, The Hardware/Software Interface*; bearing a date of Aug. 2, 2004; 83 pages total; 3rd Edition; Morgan Kaufmann Publishers, Inc.

Patterson, David A. et al.; "Chapter 3—Pipelining"; *Computer Architecture: A Quantitative Approach*; bearing a date of Jan. 1996; pp. 125-164; 2nd Edition; Morgan Kaufmann Publishers, Inc.

* cited by examiner

HYBRID BRANCH PREDICTOR USING COMPONENT PREDICTORS EACH HAVING CONFIDENCE AND OVERRIDE SIGNALS

CROSS-REFERENCE TO RELATED APPLICATIONS

This subject matter of this application is related to the subject matter of co-pending application, entitled "Hierarchical Processor," Ser. No. 11/215,833 filed on Aug. 29, 2005, hereby incorporated by reference.

BACKGROUND

The successful resolution of conditional branches is an important issue in modern microprocessors. When a conditional branch enters an execution pipeline, the instructions following the branch may typically wait for the branch resolution. A common solution to this problem is speculative execution: the branch outcome and/or its target may be dynamically or statically predicted, so the execution may proceed without stalling. However, if a branch is mispredicted, speculatively executed instructions are typically flushed and their results discarded, thus wasting a significant number of processor clock cycles.

DETAILED DESCRIPTION

Figure 1:
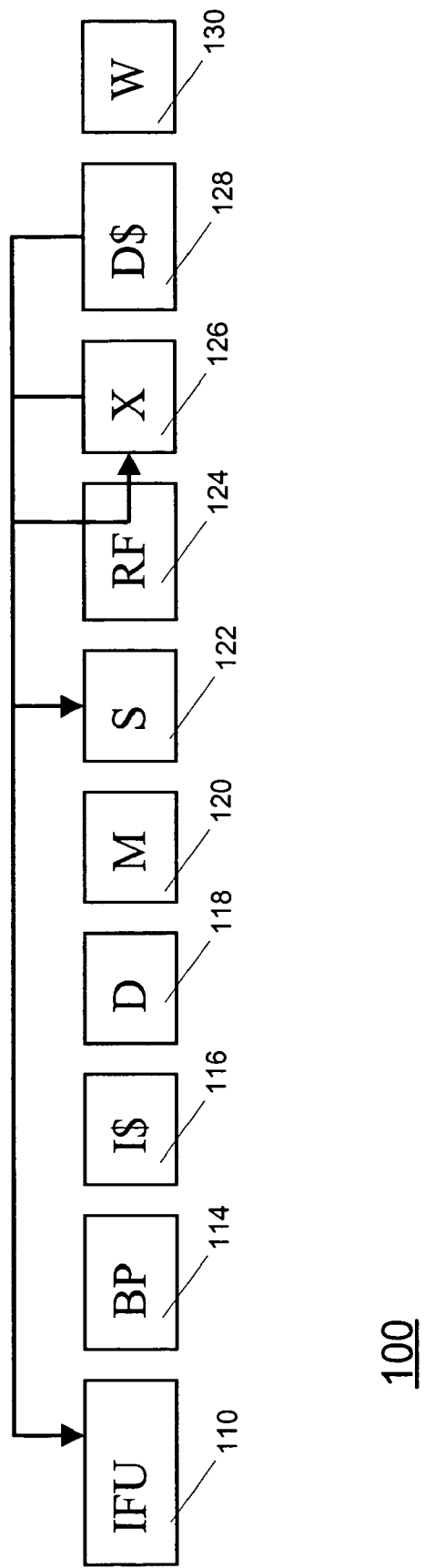
FIG. 1 is a block diagram illustrating an instruction pipeline of a processor 100 according to an example embodiment.

Referring to the Figures in which like numerals indicate like elements, FIG. 1 is a block diagram illustrating an instruction pipeline of a processor 100 according to an example embodiment. According to an example embodiment, processor 100 may be hierarchical or may include one or more stages that may be multilevel. In an example embodiment, one or more pipeline stages may be grouped into a cluster (or execution cluster). Processor 100 may include multiple parallel clusters, with, for example, one or more stages being replicated in each cluster to provide parallel processing paths.

Referring to FIG. 1, an instruction pipeline of processor 100 may include a number of pipeline stages (or pipestages). Although not shown, one or more of the pipeline stages may include multiple structures or may be multilevel. Processor 100 may include an instruction fetch unit (IFU) 110 to fetch instructions to be decoded and executed. The instructions fetched may be, for example, architectural instructions, which later in the pipeline may be decoded into one or more micro-operations or micro-ops (uops).

Processor 100 may include a branch predictor system (BP) 114 to predict whether a branch instruction will be taken or not. An output from branch predictor system 114 (e.g., taken or not taken) may, for example, cause instruction fetch unit 110 to begin fetching instructions from a branch path (e.g., if a branch instruction is predicted as taken) or to continue fetching instructions along a fall-through path (e.g., if the branch is predicted as not taken). The instruction pointer (IP) (e.g., address) for each fetched instruction may be provided to the branch predictor system 114 to allow the branch predictor system 114 to predict whether a branch instruction will be taken or not taken.

Processor 100 may also include an instruction cache (I$) 116 to cache fetched instructions. A level 2 instruction cache (not shown) may also be provided. An instruction decoder (D) 118 may decode each fetched (e.g., architectural) instruction into one or more micro-operations or micro-ops (uops). Processor 100 may include a mapper (or register renamer) (M) 120 to map architectural registers to physical (or virtual) registers.

An instruction scheduler (S) 122 may generally schedule micro-ops (uops) for execution, for example, when operands for the instruction are ready and the appropriate execution resources are available. According to an example embodiment, the scheduler may be a single scheduler or may include a multilevel scheduler (or multiple schedulers), such as a level 2 scheduler and a level 1 scheduler (not shown).

According to an example embodiment, processor 100 may include a limited set of architectural registers (e.g. eax, ebx, . . . ) that may be seen or accessed by a programmer. Processor 100 may include a larger set of physical registers, shown as the register file (RF)124. A register (or entry) in the register file 124 may be allocated for each uop to store the execution result for the micro-op. The register file may also store status information indicating the status of each micro-op. The different status for a uop that may be tracked in its entry in the register file 124 may include, for example: uop is scheduled for execution, uop is executing, uop has completed execution and results are being written back to the register file entry, uop is ready for retirement, and uop is being retired.

Processor 100 may include one or more execution units 126 to execute uops. The execution units may include one or more ALU (arithmetic logic unit) execution units and one or more memory load and memory store execution units, for example. A data cache (D$) 128 may be provided to cache data, execution results, etc. Although not show, the processor 100 may include one or more store buffers. An instruction window logic 130 may be provided to handle retirement of uops.

Figure 2:
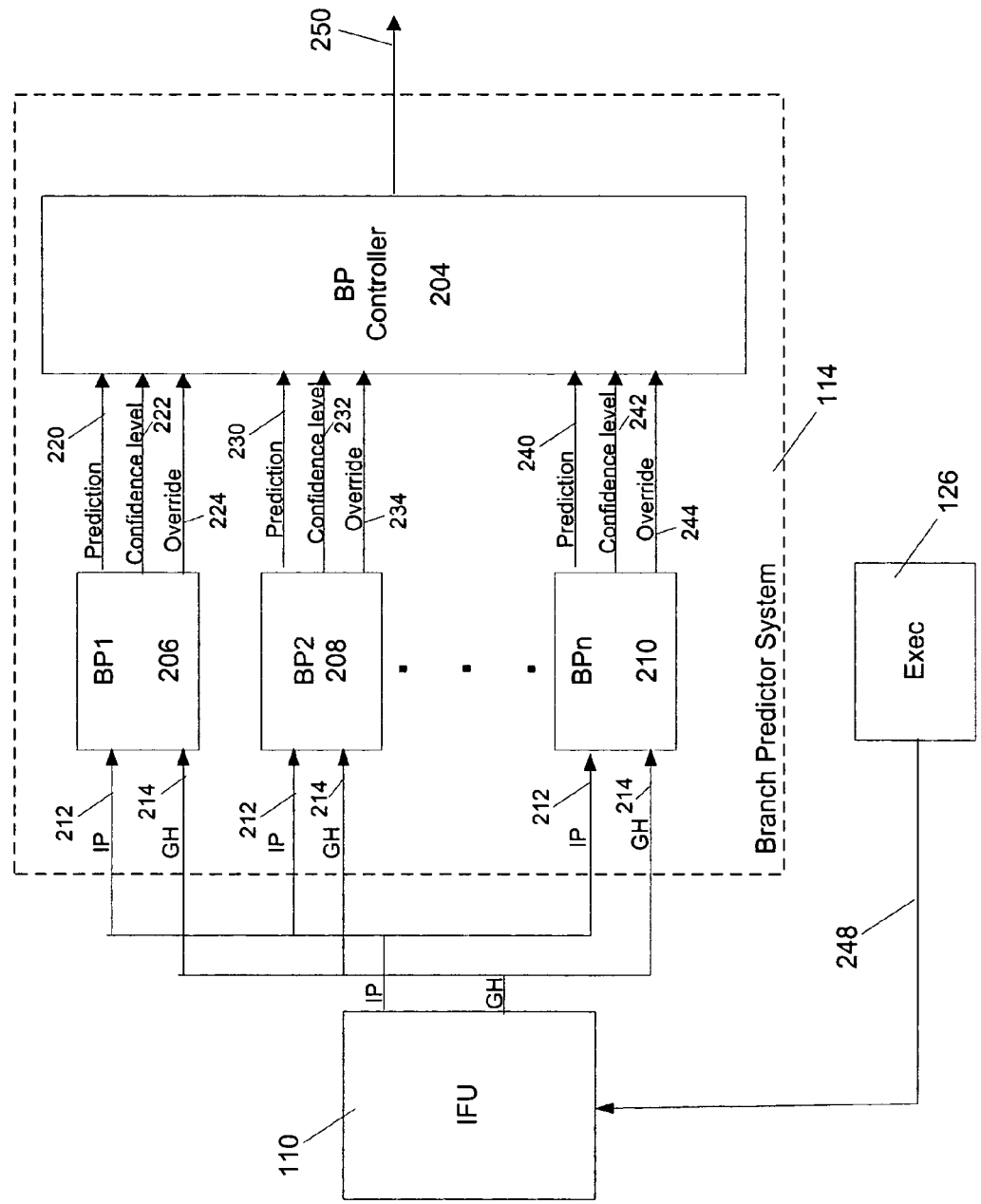
FIG. 2 illustrates a block diagram of a branch predictor system 114 according to an example embodiment.

FIG. 2 illustrates a block diagram of a branch predictor system 114 according to an example embodiment. Branch predictor system 114 may include one or more branch predictors. According to an example embodiment, branch predictor system 114 may include two or more branch predictors, including branch predictor (BP1) 206, branch predictor (BP2) 208, . . . and branch predictor (BPn) 210. Although three branch predictors are shown, branch predictor system 114 may include any number of branch predictors. Branch predictors 206 (BP1), 208 (BP2) and 210 (BPn) may be any type of branch predictors, such as dynamic branch predictors, static branch predictors, etc. There are a wide variety of branch prediction mechanisms.

Figure 3:
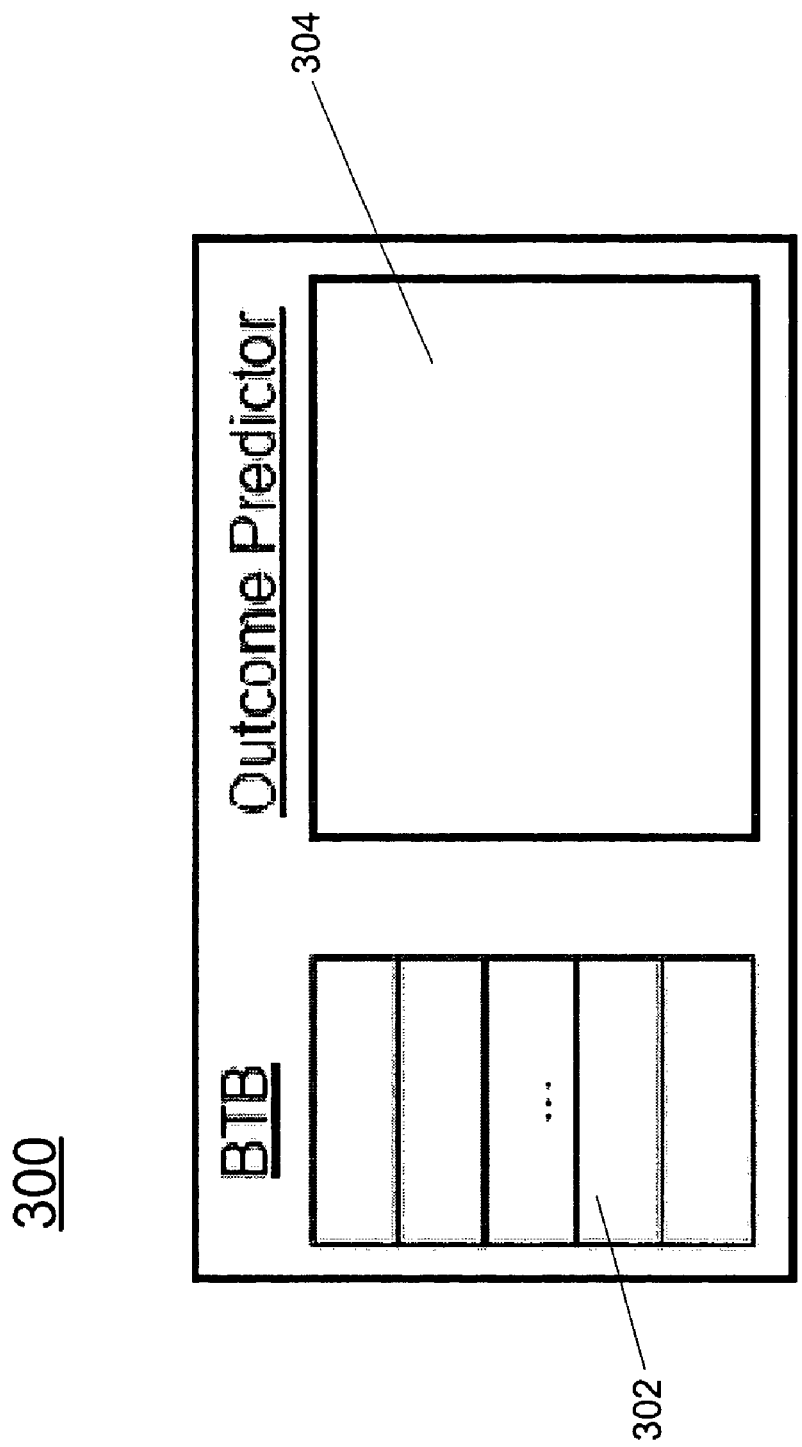
FIG. 3 is a diagram illustrating a branch predictor 300 that uses a branch target buffer (BTB) according to an example embodiment.

FIG. 3 is a diagram illustrating a branch predictor 300 that uses a branch target buffer (BTB) 302, where the BTB 302 is provided for prediction of branch targets, and an outcome predictor 304 may be provided for prediction of branch outcomes. In this example branch predictor, the branch target buffer (BTB) 302 may be a cache, where a part of the branch address (or instruction pointer or IP for the conditional branch) may be used as a cache index, and the cache data may be, for example, the last target address of that branch. More complex BTBs may hold multiple target addresses, and may include some mechanism to choose which address should be speculatively executed.

Figure 4:
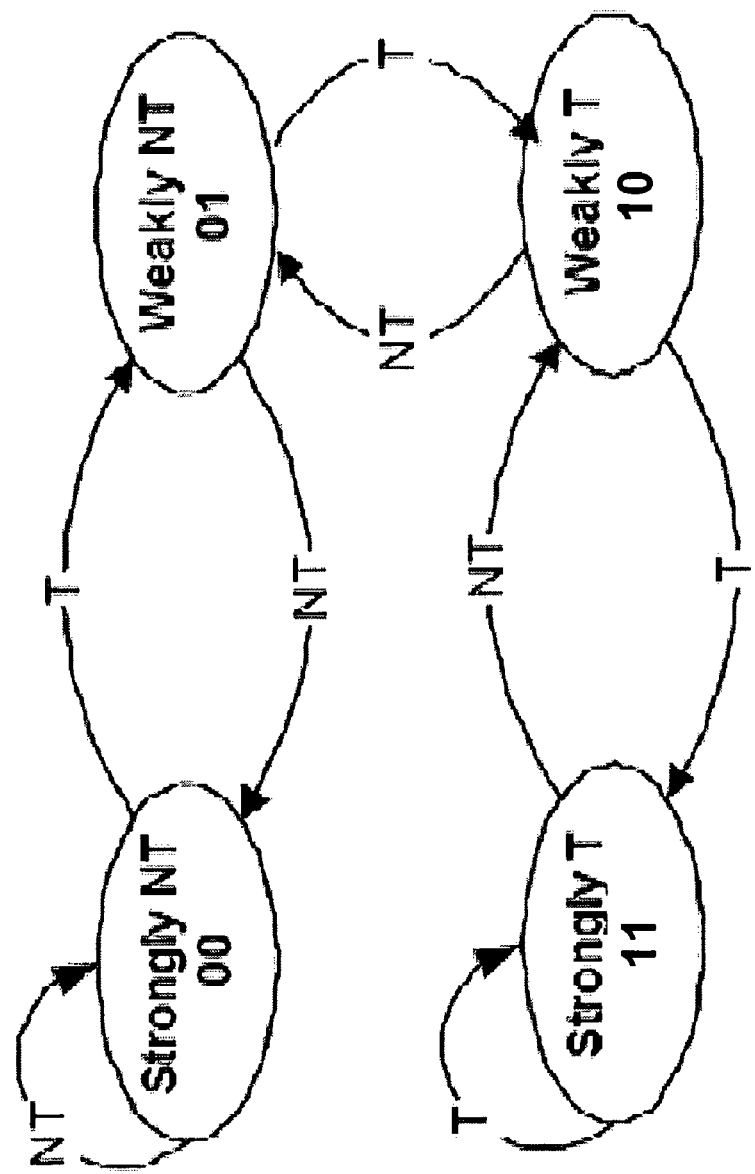
FIG. 4 is a diagram of a finite state machine, which may provide the basis of a saturating two-bit counter that may be used for dynamic prediction of a branch outcome, according to an example embodiment.

FIG. 4 is a diagram of a finite state machine, which may provide the basis of a saturating two-bit counter that may be used for dynamic prediction of a branch outcome (branch prediction). The counter may range in states from 00 to 11 (e.g., 00 indicating strongly not taken, 01 indicating weakly taken, 10 indicating weakly taken, and 11 indicating strongly taken). The prediction output by this predictor may be taken/not taken, and may also provide a supplemental output, such as weak or strong. For example, every time a branch is taken, the two-bit counter for that branch (or for that IP or address) is incremented (saturating at 11 ), and every time the branch is not taken, the counter is decremented (saturating at 00). This is an example of a per-IP (instruction pointer) branch predictor that uses a counter (since the counter keeps track of the last branch results for this branch instruction). The counter may be provided as a two-bit cell in a branch prediction table (BPT), with a counter provided for each branch instruction. The BPT may be accessed in different ways, such as using a portion of the IP (branch instruction) address to index to the BPT. This is an example of a local branch predictor since the prediction is based on the local (per-IP) branch history.

Other types of branch predictors may rely on global branch history, such as by using a branch history register (BHR), which may be a shift register or other structure that may keep the history of N most recent branch outcomes (e.g., N most recent branch instructions). In general, predictors that use global history may benefit from correlations between subsequent branches in the program execution flow, while local predictors may be based on correlation between subsequent executions of the same branch instruction.

Figure 5:
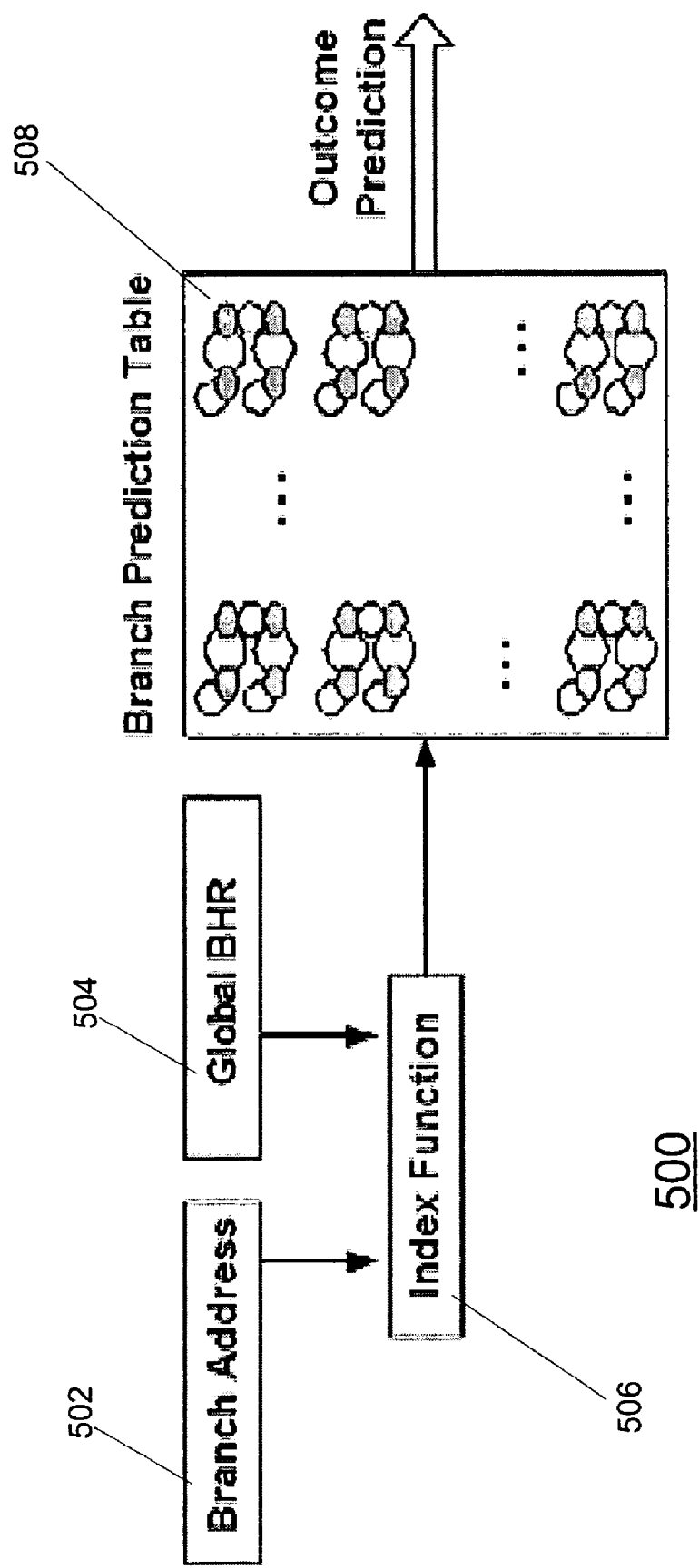
FIG. 5 is a diagram that illustrates another example branch predictor that uses a combination of global history and the branch address (or IP), according to an example embodiment.

FIG. 5 is a diagram that illustrates another example branch predictor 500 that uses a combination of global history (via a BHR 504) and the branch address 502 (or IP) to generate an index (using an index function 506) into a branch prediction table (BPT) 508 to produce an outcome prediction or branch prediction. These are just a few examples of branch predictors that may be used. There are many other predictors that may be used as well, such as GShare, GSelect, GSkew, etc.

Referring to FIG. 2 again, an instruction fetch unit (IFU) 110 fetches instructions (or uops), and provides the IP (instruction pointer) or address of the instruction to branch predictor system 114 for branch prediction. Also, instructions or uops may be executed further in the pipeline by execution unit 126, and execution results are provided via line 248 to a structure, such as the IFU 110. The IFU 110 (or other structure) may generate and provide a global branch history, e.g., via a branch history register.

As shown in FIG. 2, IFU 110 may provide the instruction pointer or IP of each branch instruction (address) and/or a global branch history (GH) to one or more branch predictors, such as BP1 206, BP2 208, . . . BPn 210. The IP or branch address is provided via lines 212, while the global branch history (GH) may be provided via lines 214, to each branch predictor. Some predictors may use only the IP address and local history for each branch instruction (e.g., a per-IP predictor), while some predictors may use the global branch history (e.g., a per-history predictor), while other predictors may use a combination of the instruction pointer or branch address and the global history. Yet other predictors may rely on additional information or even different information to make branch predictions.

As shown in FIG. 2, each branch predictor (e.g., 206, 208, 210) may generate a number of outputs to a branch prediction (BP) controller 204. The BP controller 204 may receive information from one or more branch predictors (e.g., 206, 208, 210) and may generate an overall branch prediction via line 250.

Referring to FIG. 2, the outputs from each branch predictor may include, for example, a branch prediction (or prediction), a confidence level and an override signal. The signals output by branch predictors may be different, or may include additional output signals, not shown. Branch predictor 206 (BP1) may output a prediction via line 220, a confidence level via line 222 and an override signal via line 224. Branch predictor 208 (BP2) may output a prediction via line 230, a confidence level via line 232 and an override signal via line 234. Likewise, branch predictor 210 (BPn) may output a prediction via line 240, a confidence level via line 242 and an override signal via line 244. In another embodiment, different predictors may output different types of signals.

The prediction output by each predictor (via lines 220, 230 and 240 for predictors 206, 208 and 210, respectively) may be the branch prediction for this branch instruction (or IP), e.g., taken or not taken. As noted above, each branch predictor (e.g., 206, 208, 210) may use a variety of different techniques for branch prediction. In an embodiment, each predictor (206, 208, 210, etc.) may be a different type of predictor or may use a different technique for branch prediction, although this is merely another example embodiment and is not required.

The confidence level output by each predictor (output via lines 222, 232 and 242 for predictors 206, 208 and 210, respectively) may, for example, provide a measure of the predictor's accuracy, e.g., for this branch instruction. It may be based upon, for example, how often this predictor was correct over the last M times it predicted the outcome for this branch instruction. Therefore, the execution results (e.g., indicating whether a branch prediction was correct or not) from execution units 126 may be used to dynamically update the confidence level for each predictor (e.g., for each branch instruction or IP). The confidence level may be different for different branch instructions, and it may change over time (e.g., a dynamic value). Alternatively, the confidence level may be based upon, for example, the global history, e.g., how often this predictor was correct over the last M branch instructions. These are just a few examples of confidence levels, and this disclosure is not limited thereto. Confidence levels may be generated or provided in a number of different ways based on different types of information. In general, the prediction and confidence level for each predictor may be based upon, for example, one or more of: local per-IP branch prediction information (e.g., per-IP branch prediction table), global branch history (e.g., a global branch history register or table), execution results, data kept local to each branch predictor and accumulated over time, and/or other information.

In general, according to an example embodiment, an override signal, if asserted, may indicate that the override information may control (and override at least some other signals) in the selection of a prediction, instead of the other signals being used to control the selection of a branch prediction.

The override signal output by each predictor (e.g., override signal 224, override signal 234 and override signal 244 output from branch predictors 206, 208 and 210, respectively) may indicate when the predictor that is asserting the override signal should be trusted, regardless of short term history and/or confidence levels output by the predictors. There may be a variety of conditions that may be detected or measured, which may cause a branch predictor to assert its override signal (also known as a positive override signal). In an example embodiment, where a predictor has asserted its override signal (positive override signal), BP controller 204 may use the prediction from such predictor, without regard to short term history and the confidence levels by the different predictors.

In another embodiment, the override signal may actually include two different override signals: a positive override signal that may indicate the predictor asserting the positive override signal should be trusted, regardless of short term history and the signals (e.g., confidence levels) output by other predictors. This positive override signal is described above.

However, in addition to a positive override signal, each branch predictor may assert a negative override signal that may indicate that the predictor asserting the negative override signal should not be trusted, e.g., regardless of short term history and confidence levels output by each predictor. There may be a variety of conditions that may be detected or measured, which may cause a branch predictor to assert its negative override signal. Thus, according to an example embodiment, when a predictor asserts its negative override signal, BP controller 204 may ignore (e.g., not select) the prediction from the asserting predictor, even if that predictor outputs the highest confidence level, for instance.

Figure 6:
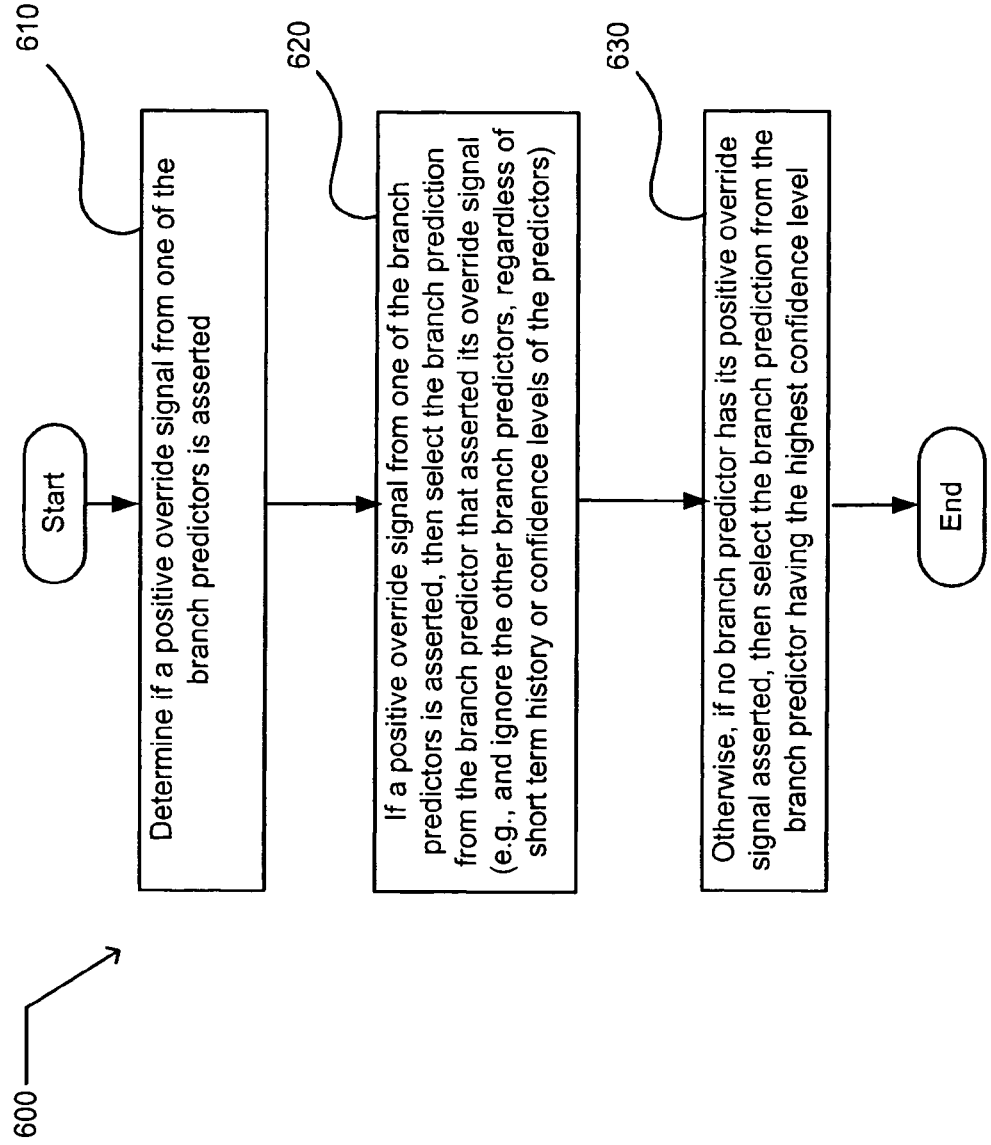
FIG. 6 illustrates an operational flow 600 representing example operations to select a branch prediction where a predictor may have asserted a positive override signal.
Figure 7:
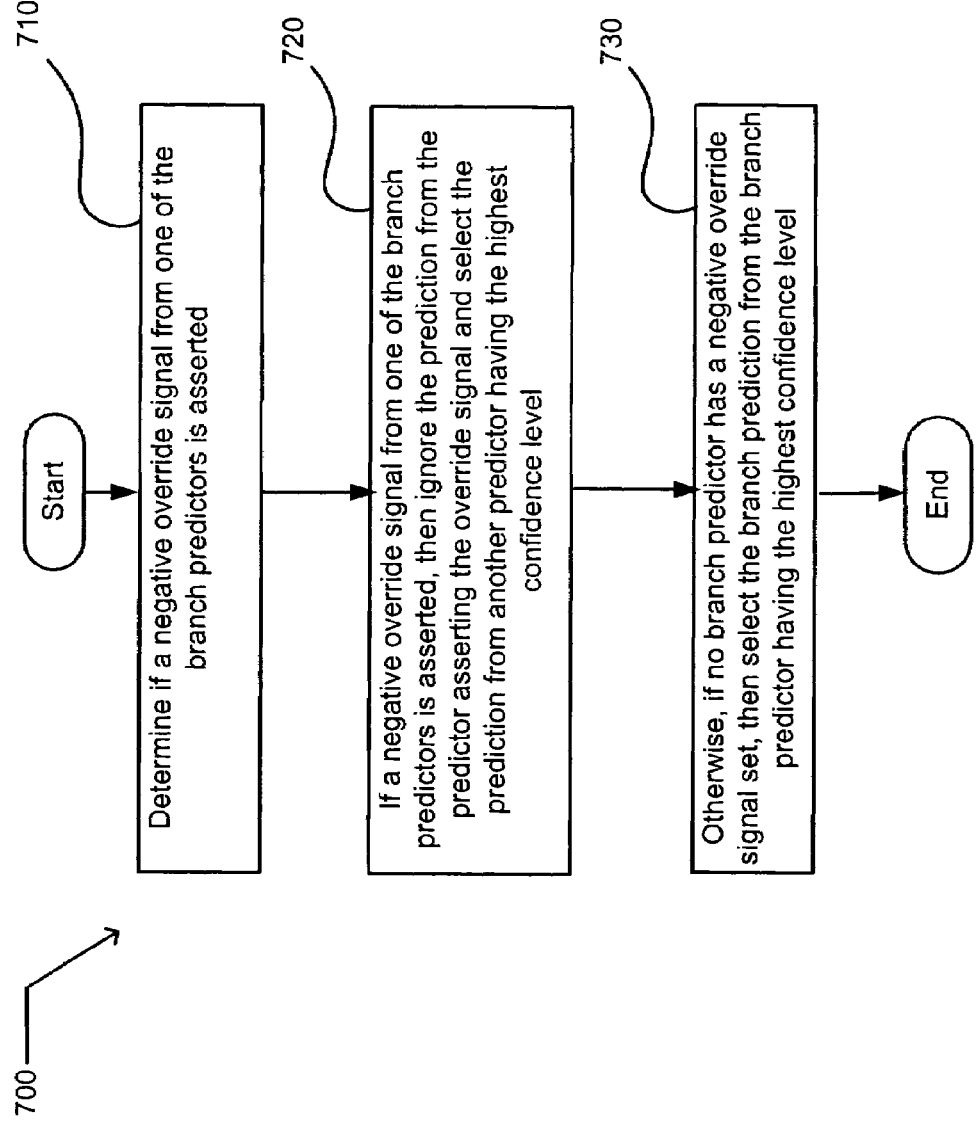
FIG. 7 illustrates an operational flow 700 representing example operations to select a branch prediction where a predictor may have asserted a negative override signal.

FIGS. 6 and 7, include various examples of operational flows. With respect to these FIGS., discussion and explanation may be provided with respect to the above-described examples of FIGS. 1 and 2 and/or with respect to other examples and contexts. However, it should be understood that the operational flows may be executed in a number of other environments and contexts, and/or in modified versions of FIGS. 1 and 2. Also, although the various operational flows are presented in the sequence(s) illustrated, it should be understood that the various operations may be performed in other orders than those which are illustrated, or may be performed concurrently. In an example embodiment, one or more (or even all) of the operations described in the operational flows of FIGS. 6 and 7 may be performed, either completely or in part, by BP controller 204 (FIG. 2), although this is not required. These operations may be performed e.g., by BP controller 204, with assistance of other circuits, which may be shown in the other FIGS., or may not be shown.

FIG. 6 illustrates an operational flow 600 representing example operations to select a branch prediction where a predictor may have asserted a positive override signal. After a start operation, the operational flow 600 moves to operation 610. At operation 610, it is determined if a positive override signal has been asserted by one of the branch predictors. For example, BP controller 204 may determine if one of branch predictors 206, 208 and 210 have asserted their positive override signal.

At operation 620, if a positive override signal has been asserted by one of the branch predictors (e.g., 206, 208, 210), then the branch prediction from the branch predictor that asserted the override signal is selected, e.g., by BP controller 204. In an example embodiment, this branch prediction (of the asserting predictor) may be selected regardless of short term history or confidence levels of the predictors.

Otherwise, at operation 630, if no positive override signal has been asserted, then a branch prediction may be selected (e.g., by BP controller 204) from the branch predictor having the highest confidence level.

FIG. 7 illustrates an operational flow 700 representing example operations to select a branch prediction where a predictor may have asserted a negative override signal. After a start operation, the operational flow 700 moves to operation 710. At operation 710, it is determined if a negative override signal has been asserted by one of the branch predictors.

At operation 720, if a negative override signal was asserted by one of the branch predictors, then the prediction from the predictor asserting the negative override signal may be ignored, and the prediction from another predictor having the highest confidence level may be selected. Thus, according to an example embodiment, the prediction from a predictor asserting a negative override signal may be ignored even if the asserting predictor has the highest confidence level.

At operation 730, otherwise, if no negative override signal has been asserted, then a branch prediction may be selected (e.g., by BP controller 204) from the branch predictor having the highest confidence level.

According to an example embodiment, the branch prediction system 114 may be used in isolation, or may be used in combination with one or more other branch predictors, and/or may be used at any level of a hierarchical or multilevel branch predictor. For example, in a multilevel branch predictor, the latest resolving branch prediction may control or override previous branch predictions. Therefore, in addition to selecting a branch prediction, BP controller 204 may (or may not) terminate a previously selected branch prediction, if such previously selected branch prediction is not the branch prediction selected by controller 204, for example, although this is not required. Therefore, controller 204 may both select a branch prediction and may also deselect or terminate a previously selected branch prediction, e.g., based on the confidence level, prediction and override signal from each predictor.

Figure 8:
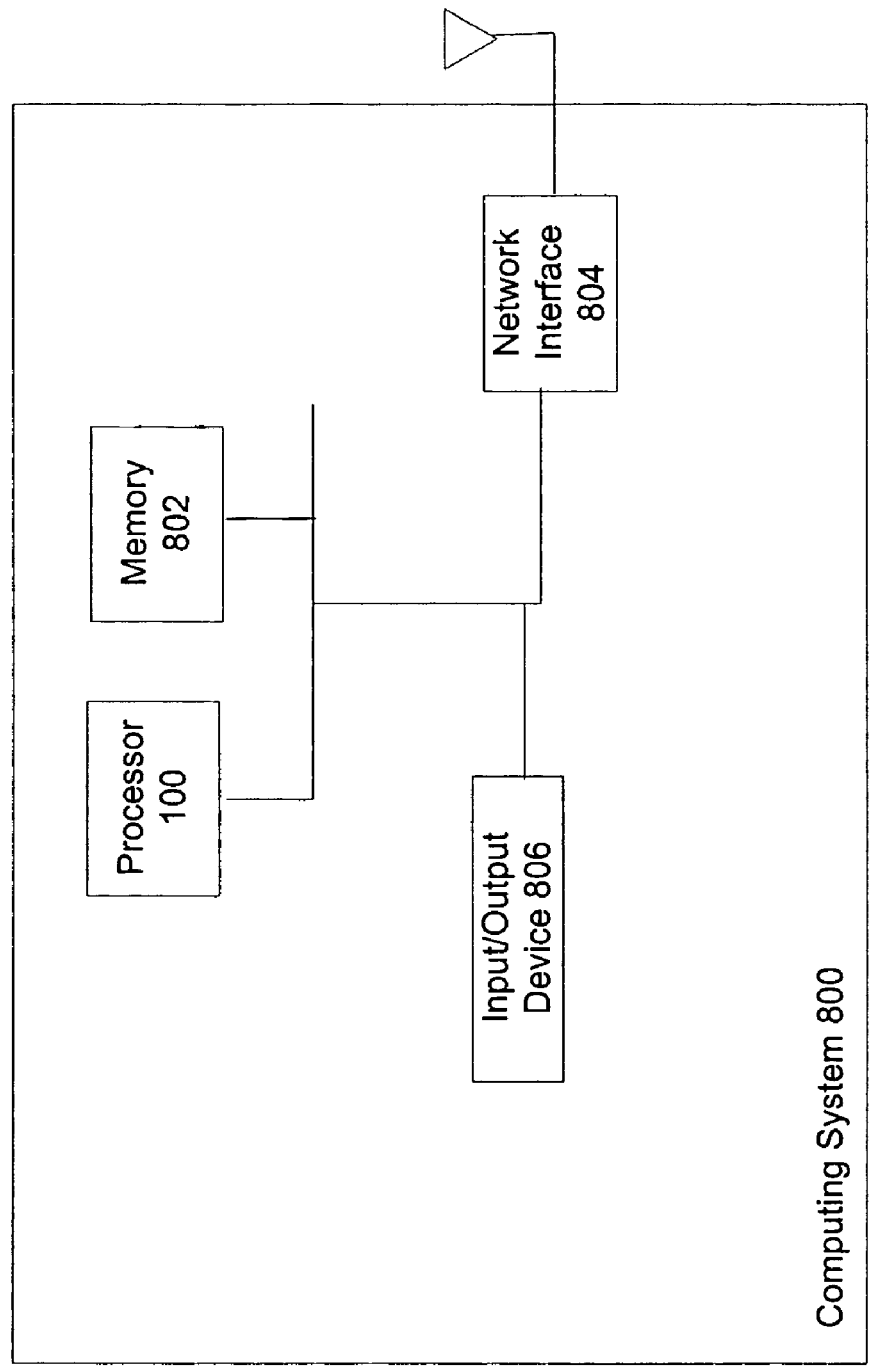
FIG. 8 is a block diagram of a computing system according to an example embodiment.

FIG. 8 is a block diagram of a computing system according to an example embodiment. Computing system 800 may include processor 100 (which may include one or more branch predictors and a BP controller 204, as described above), a memory 802 to store data and other information, an input/output device 806, which may be a keyboard, mouse or other I/O device. Computing system 800 may also include a network interface 804, which may be, for example, an Ethernet network interface, a wireless interface, a wireless LAN (local area network) or WLAN interface, a cellular interface, etc. Computing system 800 may also include other devices that are commonly included in such computing systems. Computing system 800 may include, for example, without limitation, a computer, a personal computer or PC, a laptop, a personal digital assistant (PDA), a cell phone or mobile phone, a wireless device, a WLAN phone, a router or switch, a wireless access point, a network device, etc.

While certain features of the described implementations have been illustrated as disclosed herein, many modifications, substitutions, changes and equivalents will now occur to those skilled in the art. It is, therefore, to be understood that the appended claims are intended to cover all such modifications and changes as fall within the true spirit of the various embodiments.

What is claimed is:
1. A processor comprising:
a plurality of branch predictors, wherein each branch predictor is configured to produce and provide a prediction, a confidence level and an override signal, each override signal from each branch predictor being determined uniquely from other override signals of other branch predictors, and wherein each override signal from each branch predictor comprises an independent override signal produced using an independent override logic associated with each branch predictor; and a branch prediction control circuit configured to generate a branch prediction based on the prediction, the confidence level and the override signal from each predictor, wherein the override signal of a particular predictor results in one of (i) the prediction of the particular predictor being accepted by the processor regardless of the confidence levels of the other predictors and the confidence level of the particular predictor and (ii) the prediction of the particular predictor not being accepted by the processor regardless of the confidence level of the particular predictor.

2. The processor of claim 1 wherein the override signal of each branch predictor includes a respective positive override signal indicating that a prediction of a particular branch predictor of the plurality of branch predictors asserting its positive override signal should be accepted by the processor regardless of the predictions of the other branch predictors of the plurality of branch predictors and the confidence level of the particular branch predictor.

3. The processor of claim 1 wherein the override signal of each branch predictor includes a respective negative override signal indicating that a prediction of a particular branch predictor of the plurality of branch predictor asserting its negative override signal should not be accepted by the processor.

4. A method comprising:
receiving a respective branch prediction from each of a plurality of predictors in a processor;
receiving a respective confidence level for each of the branch predictions from each of the plurality of predictors;
receiving a respective override signal associated with each of the branch predictions from each of the plurality of predictors, wherein the respective branch predictions, the respective confidence levels and the respective override signals are produced and provided by the plurality of predictors, each override signal from each branch predictor being determined uniquely from other override signals of other branch predictors, and wherein receiving a respective override signal associated with each of the branch predictions from each of the plurality of predictors comprises receiving an independent override signal produced using an independent override logic associated with each branch predictor;
determining if any of the respective override signals has been asserted;
if any of the respective override signals is determined as being asserted, then modifying at least one aspect of selecting a prediction signal responsive to the asserted override signal; and
if none of the respective override signals is determined as being asserted, then selecting a prediction signal based on the respective confidence levels received from the plurality of predictors.

5. A method comprising:
receiving respective branch predictions from a plurality of predictors in a processor;
receiving respective confidence levels for each of the branch predictions from the plurality of predictors;
receiving respective override signals associated with each of the branch predictions from the plurality of predictors, wherein the respective branch predictions, the respective confidence levels and the respective override signals are produced and provided by the plurality of predictors, each override signal from each branch predictor being determined uniquely from other override signals of other branch predictors, and wherein receiving respective override signals associated with each of the branch predictions from the plurality of predictors comprises receiving an independent override signal produced using an independent override logic associated with each branch predictor;
determining if any of the override signal has been asserted; and
selecting one of the branch predictions, based, at least in part, on whether any of the override signals has been asserted, wherein selecting one of the branch predictions includes at least one of:
selecting a prediction from a predictor asserting a positive override signal and taking a branch corresponding with the selected prediction of the predictor asserting the positive override signal; and
selecting a prediction from a predictor not asserting a negative override signal and taking a branch corresponding with the selected prediction of the predictor not asserting the negative override signal.

6. A method comprising:
determining if one of a plurality of positive override signals has been produced by, and asserted from one of a plurality of respective predictors in a processor, each override signal from each branch predictor being determined uniquely from other override signals of other branch predictors, wherein determining if one of a plurality of positive override signals has been produced by, and asserted from one of a plurality of respective predictors in a processor comprises determining if one of a plurality of positive override signals has been produced by, and asserted from one of a plurality of respective predictors in a processor, wherein each override signal is an independent override signal produced using an independent override logic associated with each branch predictor;
if the one of the plurality of positive override signals is determined as being produced and asserted from a respective one of the predictors, then selecting a branch prediction from the respective predictor that asserted the positive override signal and taking a branch associated with the selected branch prediction from the predictor that asserted the positive override signal regardless of respective confidence levels provided by each predictor; and
otherwise, if the one of the plurality of positive override signal is not determined as being produced and asserted, then selecting a branch prediction from a branch predictor having a highest confidence level and taking a branch corresponding with the branch prediction from the branch predictor with the highest confidence level.

7. A method comprising:
determining if one of a plurality of negative override signals has been produced by, and asserted from one of a plurality of respective predictors in a processor, each override signal from each branch predictor being determined uniquely from other override signals of other branch predictors, and wherein determining if one of a plurality of negative override signals has been produced by, and asserted from one of a plurality of respective predictors in a processor comprises determining if one of a plurality of negative override signals has been produced by, and asserted from one of a plurality of respective predictors in a processor, wherein each override signal is an independent override signal produced using an independent override logic associated with each branch predictor;

if the one of the plurality of negative override signals has been produced and asserted, then selecting a branch prediction from a predictor having a highest confidence level that did not assert the negative override signal, and taking a branch corresponding with the branch prediction from the branch predictor having the highest confidence level that did not assert the negative override signal regardless of a confidence level of the predictor that asserted the negative override signal; and otherwise, if the one of the plurality of negative override signals has not been produced and asserted, then selecting a branch prediction from a predictor having a highest confidence level.

8. A method comprising:

receiving respective branch predictions from a plurality of predictors in a processor;

receiving respective confidence levels for each of the branch predictions from the plurality of predictors;

receiving respective override signals associated with each of the branch predictions from the plurality of predictors, wherein the respective branch predictions, the respective confidence levels and the respective override signals are produced and provided by the plurality of predictors, each override signal from each branch predictor being determined uniquely from other override signals of other branch predictors, and wherein receiving respective override signals associated with each of the branch predictions from the plurality of predictors comprises receiving an independent override signal produced using an independent override logic associated with each branch predictor;

determining if any of the override signal has been asserted; and selecting one of the branch predictions, based, at least in part, on whether any of the override signals has been asserted, wherein selecting one of the branch predictions includes at least one of:

selecting a prediction from a predictor asserting a positive override signal and taking a branch corresponding with the selected prediction of the predictor asserting the positive override signal; and selecting a prediction from a predictor not asserting a negative override signal and taking a branch corresponding with the selected prediction of the predictor not asserting the negative override signal.

9. The method of claim 4 wherein modifying at least one aspect of selecting a prediction signal responsive to the asserted override signal includes:

modifying at least one aspect of selecting a prediction signal responsive to the asserted override signal regardless of the confidence levels of the other predictors and the confidence level of the particular predictor.

10. The method of claim 5 wherein selecting a prediction from a predictor asserting a positive override signal and taking a branch corresponding with the selected prediction of the predictor asserting the positive override signal includes:

selecting a prediction from a predictor asserting a positive override signal and taking a branch corresponding with the selected prediction of the predictor asserting the positive override signal regardless of the confidence levels of the other predictors and the confidence level of the particular predictor.

* * * * *

UNITED STATES PATENT AND TRADEMARK OFFICE
CERTIFICATE OF CORRECTION

PATENT NO.        : 7,644,258 B2                                      Page 1 of 1
APPLICATION NO.   : 11/215835
DATED             : January 5, 2010
INVENTOR(S)       : Andrew Forsyth Glew It is certified that error appears in the above-identified patent and that said Letters Patent is hereby corrected as shown below:

In the Claims:

In Claim 2, at column 7, line 23, please replace "predictions" with -- confidence levels --.

Signed and Sealed this
Twentieth Day of August, 2013

Teresa Stanek Rea
*Acting Director of the United States Patent and Trademark Office*